United States Patent [19]

Johanson

[11] Patent Number: 5,052,874
[45] Date of Patent: Oct. 1, 1991

[54] COMPACTING SCREW FEEDER

[75] Inventor: Jerry R. Johanson, San Luis Obispo, Calif.

[73] Assignee: JR Johanson, Inc., San Luis Obispo, Calif.

[21] Appl. No.: 509,591

[22] Filed: Apr. 12, 1990

[51] Int. Cl.$^5$ ............................................. B65G 33/00
[52] U.S. Cl. ................................. 414/326; 100/147; 198/666; 198/661; 414/287; 414/190; 366/186; 366/323; 222/195
[58] Field of Search ............... 414/304, 326, 218, 158, 414/175, 190, 197, 287, 288; 100/145, 150, 147; 222/195, 189, 410, 413; 406/60; 198/659, 661, 670, 666; 366/101, 105, 106, 107, 156, 186, 266, 323, 347

[56] References Cited

U.S. PATENT DOCUMENTS

| | | | |
|---|---|---|---|
| 1,991,841 | 2/1935 | Burton | 414/190 X |
| 2,404,884 | 7/1946 | Pieper | 414/218 X |
| 2,507,245 | 5/1950 | Dady | 414/190 X |
| 2,721,647 | 10/1955 | Witworth | 198/666 |
| 3,305,138 | 2/1967 | Plumb | 414/287 |
| 4,117,776 | 10/1978 | Hunt | 100/147 X |
| 4,615,647 | 10/1986 | Lukacz | 100/147 X |
| 4,881,862 | 11/1989 | Dick | 414/326 X |
| 4,978,369 | 12/1990 | Pontow et al. | 414/218 X |

FOREIGN PATENT DOCUMENTS

| | | | |
|---|---|---|---|
| 965115 | 5/1957 | Fed. Rep. of Germany | 198/661 |
| 1234427 | 10/1960 | France | 100/147 |
| 2413206 | 8/1979 | France | 100/147 |
| 206715 | 9/1986 | Japan | 198/661 |

*Primary Examiner*—Frank E. Werner
*Attorney, Agent, or Firm*—Daniel C. McKown

[57] ABSTRACT

Apparatus for densifying particulate solids and for removing air from the solids includes a screw feeder that conveys the material through a recirculation chamber, then into a high pressure shroud that is closed at its downstream end by a preloaded cover in yieldable sealing engagement with the downstream end of the high pressure shroud. In a preferred embodiment, the high pressure shroud includes a perforated section that extends upstream into the recirculation chamber so that as the particulate material is compressed by the screw in the high pressure shroud, air and some of the particles are expressed through the perforations and are contained by the recirculation chamber which directs the expressed particles downward into the screw which once again pushes them into the high pressure shroud. When the pressure in the high pressure shroud exceeds the preloading pressure applied to the cover at the downstream end of the high pressure shroud, the particulate material emerges from the shroud in a compacted and deaerated condition. The apparatus may also be used to replace a first entrained gas a second entrained gas, while at the same time providing a desired degree of densification.

14 Claims, 2 Drawing Sheets

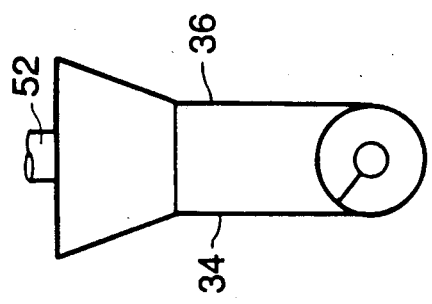
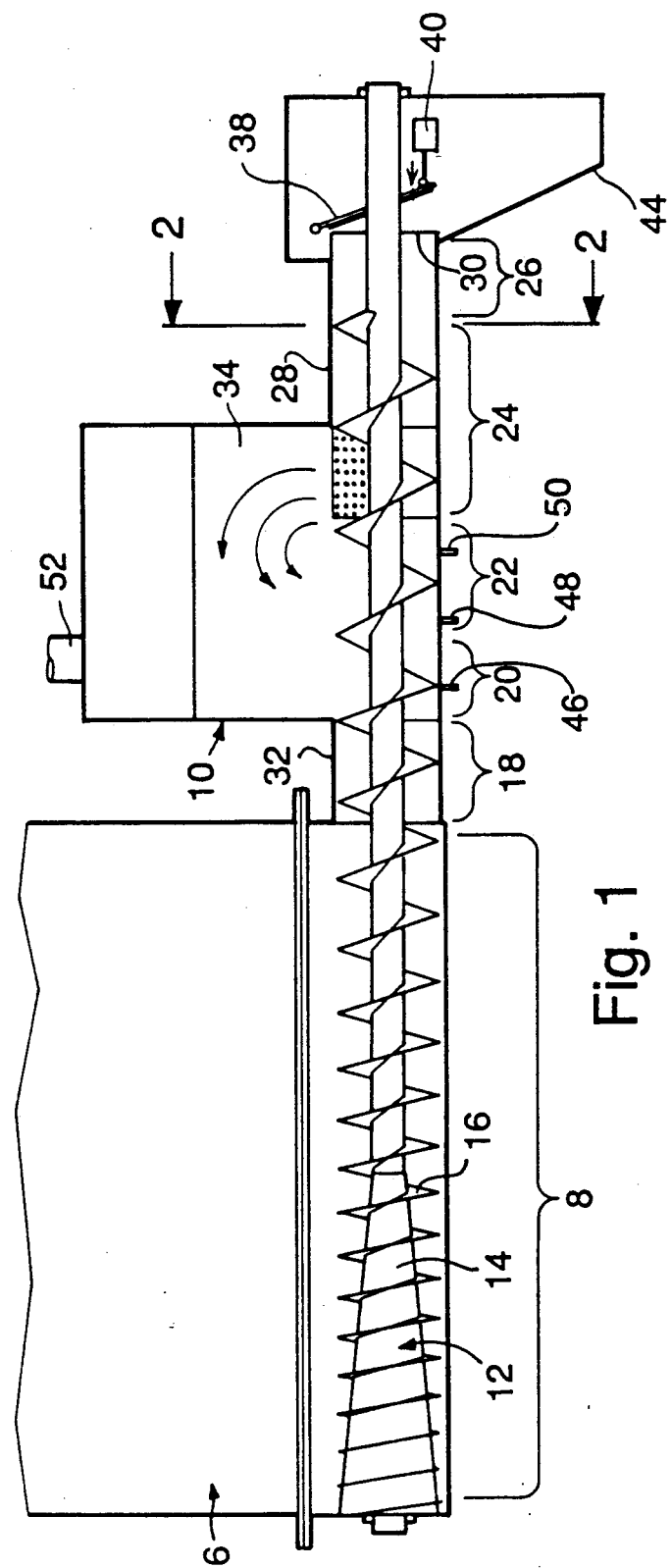

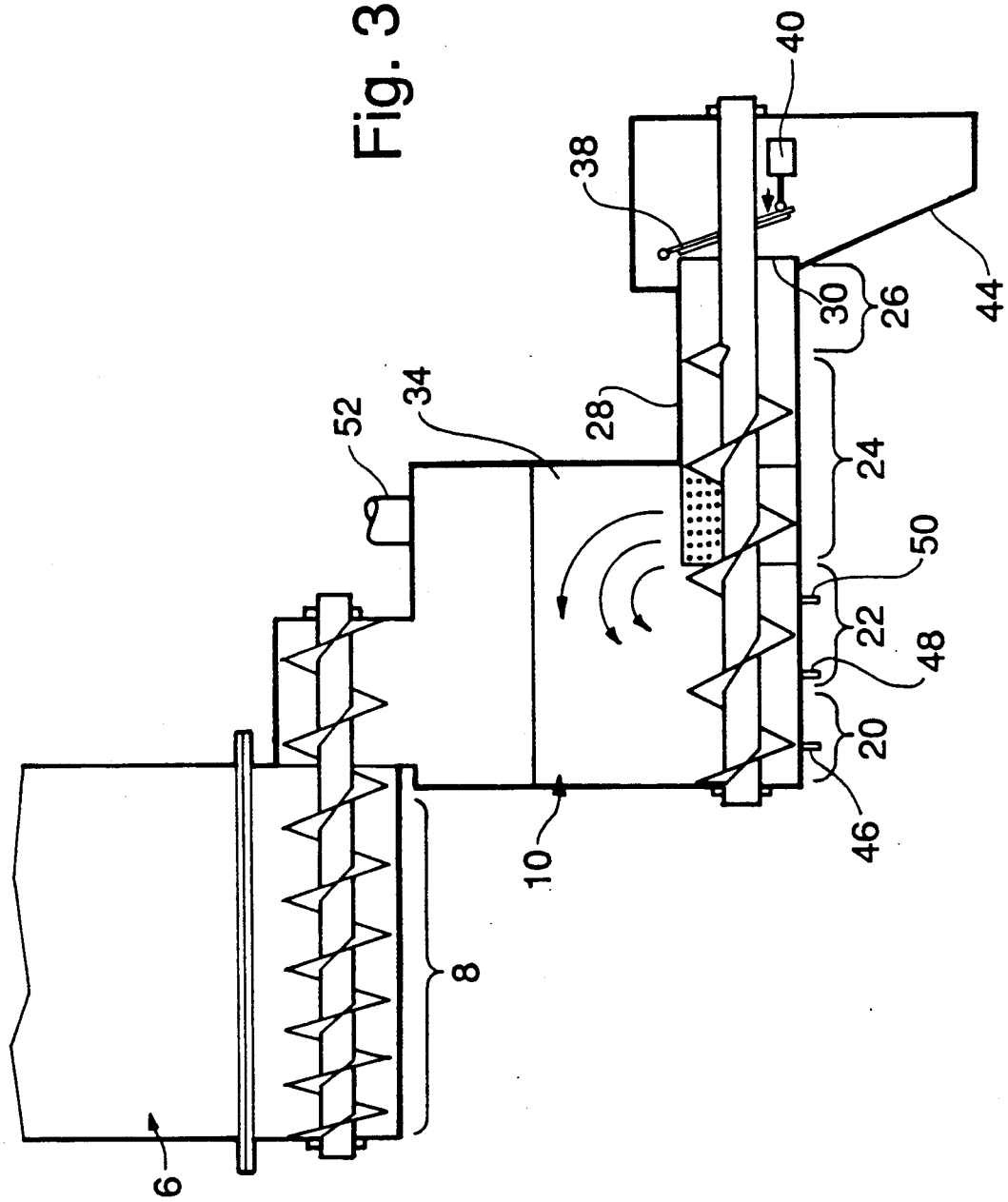

COMPACTING SCREW FEEDER

BACKGROUND OF THE INVENTION

1. Field of the Invention

The present invention is in the field of materials handling and more specifically relates to an apparatus for removing air from particulate solids. Typical applications include increasing the particulate solids density prior to placing the solids in a container; predensifying a solid prior to roll or plunger compaction; and replacing the air within the particulate solids by a different gas.

2. The Prior Art

Screw feeders are commonly used to feed and to convey particulate solids. More recently, screw feeders have been used to densify and to remove air from solids, but the apparatus used tended to be self-defeating. For example, in one application, a filter cloth was placed over a metal support structure that surrounded the screw feeder. A vacuum was then applied across the filter cloth. This usually resulted in a plugged filter cloth that had to be cleared by emptying the screw feeder and using a reverse air flow to clear the plugged filter. In another example, a screw feeder was used to drive a particulate solid into a cylindrical shroud closed at its end. No provision was made to allow the air to escape, and this resulted in a particulate solid filled with compressed air. When the solid was released from the compaction screw, it immediately g expanded to relieve the air pressure, and most of the compaction wa lost.

To eliminate these problems, the present inventor initially experimented with using a perforated barrel to allow the air to escape from the solids in the screw. Unfortunately, some of the solids also escaped through the perforations, resulting in an unwanted stream of fines that had to be collected and re-introduced into the screw feeder.

The disclosed apparatus addresses all of these problems and provides solids compaction, air release, and removes the air without removing solids or plugging filters. The apparatus of the present invention can also be used to replace the air or other gas originally present in the solids by a different gas.

SUMMARY OF THE INVENTION

In accordance with the present invention, there is provided a recirculation chamber in which any fine solids that are pressed out of the mass of particulate matter are redirected back into the screw feeder.

In the preferred embodiment, the recirculation chamber includes gas injection nozzles for replacing one gas by another.

In accordance with the present invention, the high pressure shroud into which the screw feeder pushes the particulate solids is provided at its downstream end with a preloaded cover that maintains a yieldable sealing engagement with the output end of the high pressure shroud. This permits the particulate solids pressurized by the high pressure section of the screw feeder to emerge under pressure from the high pressure shroud.

In accordance with the present invention, the portion of the feed screw that conveys the particulate solids through the recirculation chamber has a greater solids-moving capacity than the portion of the screw feeder that brings the solids into the recirculation chamber, so that overfeeding of the recirculation chamber is prevented and so that additional solids-moving capacity is available for the recirculated solids.

In one embodiment used for densifying solids, a sloping chute is provided at the end of the screw to prevent freefall of the solids with the resulting re-entrainment of air.

The novel features which are believed to be characteristic of the invention, both as to organization and method of operation, together with further objects and advantages thereof, will be better understood from the following description considered in connection with the accompanying drawings in which a preferred embodiment of the invention is illustrated by way of example. It is to be expressly understood, however, that the drawings are for the purpose of illustration and description only and are not intended as a definition of the limits of the invention.

BRIEF DESCRIPTION OF THE DRAWINGS

FIG. 1 is a diagram showing a side elevational view of a preferred embodiment of the compacting screw feeder of the present invention;

FIG. 2 is a diagram showing a cross sectional view of the compacting screw feeder of FIG. 1 taken in the direction 2—2 indicated in FIG. 1; and, FIG. 3 is a diagram showing a side elevational view of an alternative embodiment of the compacting screw feeder of the present invention.

DETAILED DESCRIPTION OF THE PREFERRED EMBODIMENT

FIG. 1 shows a preferred embodiment of the present invention used in association with a source chamber 6 in which particulate solids are stored. The apparatus includes a recirculation chamber 10 through which a screw feeder 12 extends. The screw feeder includes a shaft 14, which may be tapered in some embodiments, and a thread 16, the pitch of which may vary as described below.

The screw feeder 12 includes a number of physically-distinctive sections that are arranged in succession along its length. As will be seen below, the physical structure of each section is related to the function of that particular section.

The feed section 8 lies directly beneath the source chamber 6 and communicates with it so that the particulate solids in the source chamber 6 can freely descend into the feeding section, which draws the particulate solids towards the right as viewed in FIG. 1. The feeding section 8 has a structure which produces an increase in capacity in the direction of draw. In the preferred embodiment, this is accomplished by using a combination of variable screw pitch and variable shaft diameter, as shown in FIG. 1. In alternative embodiments, either an increasing screw pitch or a decreasing shaft diameter are used. In the preferred embodiment, the pitch should not exceed 0.6 times the maximum diameter of the threads.

The recirculation chamber 10 includes a feeder seal shroud 32 that connects the recirculation chamber with the source chamber 6, and that closely surrounds the feed seal section 18 of the screw feeder 12. The purpose of this section of the screw feeder is to limit the intake of particulate material, to prevent overfeeding of material into the recirculation chamber 10. In the preferred embodiment, the feed seal section has a constant pitch which is the same as the pitch of the immediately adjacent portion of the feeding section 8.

A conveying section 20 is located immediately downstream of the feed seal section. It provides a buffer between the feed seal section and the recirculation section 22 to prevent recirculated material from backing up the flow. For this reason, the conveying section is given a sudden increase in pitch relative to the feed seal section 18, and in the preferred embodiment, the pitch of the conveying section equals the screw diameter. Normally, the conveying section runs about half full of solids, leaving excess capacity to accommodate recirculated material.

The recirculation section 22 has the same pitch as the conveying section 20, and serves to push the recirculated material into the next section.

The recirculation chamber 10 also includes a high pressure shroud 28 that extends downstream. In the preferred embodiment, the high pressure shroud 28 also extends upstream into the recirculation chamber 10, and this portion of the high pressure shroud includes a large number of perforations. This perforated section allows the air to escape when the solids are brought under the larger pressure associated with the screw in the high pressure shroud. In some applications, depending on the properties of the specific material and the degree of deaeration desired, the perforated portion of the high pressure shroud can be eliminated.

As best seen in FIG. 2, the screw feeder 12 occupies the bottom part of the recirculation chamber 10. Parallel vertical walls rise from either side of the screw feeder. It is very important that these walls not converge downwardly, because that could lead to bridging of the material above the screw feeder in the recirculation chamber. The walls 34 and 36 must either be vertical or must have a slight downward divergence.

The space between the walls 34, 36 frequently fills with solids, and the weight of these solids provides the compacting head for the deaeration that occurs in this region. As seen in FIG. 2, above the walls 34, 36 the recirculation chamber 10 expands to insure gas disengagement. In most cases this expansion is not necessary since the air flow is usually very small.

The downstream end 30 of the high pressure shroud 28 is blocked by a preloaded cover 38 that is urged against the end 30 by a pneumatic ram 40. Compaction of the solid particulate material occurs as the material is pushed by the high pressure section 24 of the screw feeder against the preloaded cover 38. As the material is being thus compressed, the air or other gas entrained in the material is forced back into the recirculation section from which it is vented. Some of the solid material also is carried along with the expressed air and is carried with the air back into the recirculation chamber, where it eventually settles back into the screw feeder.

In the preferred embodiment, the threads of the high pressure section 24 of the screw feeder do not extend all the way to the end 30 of the high pressure shroud. This leaves a section 26 which is called the seal section. This section provides a seal against the air pressure in the high pressure section and pressure downstream of the screw.

As the screw is operated, the pressure in the seal section initially increases until it overcomes the pressure of the preloading force supplied by the pneumatic ram 40, after which a steady flow of compacted material emerges under pressure from the end 30 of the high pressure shroud. In the preferred embodiment, a sloping chute 44 is attached to the end 30 of the high pressure shroud to transfer the compacted solids and to prevent them from freely falling, which would result in re-entrainment of air.

A number of variations are possible on the preferred embodiment described above. For example, the feeding section 8 could be shortened sufficiently to dispense with the variable pitch and diameter, and this section could then be replaced with a constant-pitch screw.

The sudden increase in capacity required in the conveying section 20 could be accomplished with a sudden decrease in the shaft diameter instead of an increase in the pitch of the screw.

In some applications, the perforated high pressure shroud 28 can be completely eliminated.

In addition to compacting and deaerating a solid particulate material, the apparatus of the present invention can also be used to replace one entrained gas by another; for example, air could be replaced by dry nitrogen to retard spoilage of a food product.

The gas to be added is introduced through the gas injection nozzles 46, 48 and 50, while the gas being removed, along with some of the replacement gas is discharged through the vent 52.

Yet another variation is shown in the alternative embodiment of FIG. 3. In that embodiment, the source chamber 6 is located above, and discharges into, the recirculation chamber 10, at a location above the conveying section 20. The action and structure of the recirculation section 22 and the high pressure section 24 are the same as in the preferred embodiment of FIG. 1. Compared to that embodiment, the embodiment of FIG. 3 permits the rate at which the particulate solids are supplied to be controlled independently of the rate at which the screw feeder 20 is rotating. In the embodiment of FIG. 3, this control of the supply is accomplished by controlling the speed of feeder 8.

Thus, there has been described an apparatus for removing air from particulate solids stored in a source chamber and for compacting those solids. The apparatus makes use of a novel recirculation chamber in which those solids which escape along with the air during the high pressure phase are contained and redirected into the feed screw.

The foregoing detailed description is illustrative of one embodiment of the invention, and it is to be understood that additional embodiments thereof will be obvious to those skilled in the art. The embodiments described herein together with those additional embodiments are considered to be within the scope of the invention.

What is claimed is:

1. Apparatus for removing air from particulate solids stored in a source chamber, comprising in combination:
    a screw feeder extending in a horizontal direction and including a number of sections arrayed in succession along its length so as to subject the particulate solids to a succession of operations, said sections including,
        a feeding section extending into the source chamber for drawing the particulate solids from the source chamber into the apparatus;
        a feed seal section, adjacent said feeding section and having the same pitch as the adjacent portion of said feeding section;
        a conveying section adjacent said feed seal section and having a greater pitch to provide greater solids-moving capacity than said feed seal section;

a recirculation section adjacent said conveying section and having substantially the same pitch as said conveying section;

a high pressure section having substantially the same pitch as said recirculation section;

a recirculation chamber through which said screw feeder extends, said recirculation chamber including, a feeder seal shroud closely surrounding said feed seal section of said screw feeder;

a high pressure shroud closely surrounding said high pressure section of said screw feeder and having an output end;

said recirculation chamber further enclosing said conveying section and said recirculation section, to confine particulate solids blown out of said high pressure section of said screw feeder as the particulate solids are compressed thereby; and, a hingedly mounted preloaded cover in yieldable sealing engagement with the output end of said high pressure shroud to permit the particulate solids pressurized by said high pressure section to emerge under pressure from said high pressure shroud.

2. The apparatus of claim 1 further comprising a sloping chute attached to the output end of said high pressure shroud to prevent free-fall of the emerging particulate solids.

3. The apparatus of claim 1 wherein a portion of said high pressure shroud extends downstream beyond said high pressure section of said screw feeder so that the particulate solids in that portion tend to act as a seal between said high pressure section and the output end of said high pressure shroud.

4. The apparatus of claim 1 wherein a portion of said high pressure shroud extends upstream into said recirculation chamber.

5. The apparatus of claim 4 wherein said portion of said high pressure shroud includes a large number of perforations.

6. The apparatus of claim 1 wherein said recirculation chamber has walls that extend upward from opposite sides of said screw feeder, said walls not diverging upwardly.

7. The apparatus of claim 1 wherein said feeding section of said screw feeder includes means for producing an increase in capacity in the direction of draw.

8. The apparatus of claim 7 wherein said means includes an increasing pitch in the direction of draw to produce an increase in capacity in that direction.

9. The apparatus of claim 7 wherein said means includes a decreasing shaft diameter in the direction of draw to produce an increase in capacity in that direction.

10. The apparatus of claim 1 wherein said conveying section of said screw feeder includes means for producing an increase in capacity in the direction of draw.

11. The apparatus of claim 10 wherein said means includes an increasing pitch in the direction of draw to produce an increase in capacity in that direction.

12. The apparatus of claim 10 wherein said means includes a decreasing shaft diameter in the direction of draw to produce an increase in capacity in that direction.

13. The apparatus of claim 1 wherein said recirculation chamber further includes means for injecting a gas other than air into the space adjacent said recirculation section of said screw feeder.

14. The apparatus of claim 1 wherein said recirculation chamber further includes means for injecting a gas other than air into the space adjacent said conveying section of said screw feeder.

* * * * *